United States Patent [19]

Siciliano et al.

[11] 3,853,934

[45] Dec. 10, 1974

[54] CONTINUOUS PROCESS FOR PRODUCING POLYSILOXANE OILS

[75] Inventors: George R. Siciliano, Ballston Lake; Norman G. Holdstock, Scotia, both of N.Y.

[73] Assignee: General Electric Company, Waterford, N.Y.

[22] Filed: Jan. 14, 1974

[21] Appl. No.: 433,123

[52] U.S. Cl.................... 260/448.2 E, 260/448.8 R
[51] Int. Cl. .............................................. C07f 7/08
[58] Field of Search .. 260/448.2 E, 448.8 R, 46.5 R

[56] References Cited
UNITED STATES PATENTS

| | | | |
|---|---|---|---|
| 3,607,899 | 9/1971 | Brown et al.................. | 260/448.2 E |
| 3,714,213 | 1/1973 | Miller............................ | 260/448.2 E |
| 3,803,195 | 4/1974 | Nitzsche et al............... | 260/448.2 E |

Primary Examiner—Daniel E. Wyman
Assistant Examiner—Paul F. Shaver
Attorney, Agent, or Firm—Donald J. Voss, Esq.; E. Philip Koltos, Esq.; Frank L. Neuhauser, Esq.

[57] ABSTRACT

A continuous process for producing linear diorganopolysiloxanes of a viscosity of from 3 to 50,000 centipoise comprising continuously passing into a first column a feed mixture comprised of cyclic siloxanes, disiloxanes, silanol-stopped linear diorganopolysiloxanes of low molecular weight and triorgansiloxy end-stopped linear diorganopolysiloxanes of low molecular weight continuously transferring into said first column acid activated hydroaluminum silicate and diatomaceous earth, maintaining said first column at a temperature in the range of 150° to 250° C, continuously removing water from said first column, continuously removing a polysiloxane fluid mixture from said first column and passing it to a second column which is packed with an acid activated hydroaluminum silicate, which second column is maintained at a temperature of 150° to 170° C and continuously transferring from the said second column the desired polysiloxane product mixed with low boilers, which low boilers can then be continuously separated from the desired polysiloxanes in a distillation column.

The acid activated aluminum silicate is preferably activated with either sulfuric acid or hydrochloric acid and preferably has an acid equivalent of generally 5 to 35 milligrams of KOH per gram and more preferably 15 to 25 milligrams of KOH per gram of hydroaluminum silicate.

12 Claims, No Drawings

CONTINUOUS PROCESS FOR PRODUCING POLYSILOXANE OILS

BACKGROUND OF THE INVENTION

The present invention relates to a process for making polysiloxane oils and more particularly the present invention relates to a continuous process for making linear diorganopolysiloxane oils with the use of an acid-activated hydroalumina silicate.

Polysiloxane oils and more specifically linear diorganopolysiloxane oils having a viscosity of anywhere from 3 to 50,000 centipoise at 25° C are desirable silicone fluids which are utilized as hydraulic fluids, as ingredients for making silicone greases, as ingredients for making antifoam agents, as mold release compositons and have many other uses.

Traditionally, such polysiloxane oils have been made by taking a diorganodihalogensilane mixture which contains less than 1 percent of other silane ingredients in it and hydrolyzing it with water such that as the result of hydrolysis there resulted a mixture of linear polysiloxanes chain-stopped with silanol groups or chain-stopped with triorganosiloxy groups. Further, there was present in the mixture, diorganosiloxanes and cyclicsiloxanes. The resulting hydrolyzate was then taken and equilibrated in the presence of a catalyst and more specifically an acid catalyst such as, sulfuric acid. There was also mixed along with this hydrolyzate sufficient amount of end-stopper such as, disiloxanes and other triorganosiloxy end-stopped short chained polysiloxane polymers, and the resulting mixture of the hydrolyzate and the chain-stoppers was equilibrated in the presence of a liquid acid to form the longer chained triorganosiloxy end-stopped diorganopolysiloxane polymers or desired polysiloxane polymers of 3 to 50,000 centipoise at 25° C.

One difficulty with this prior art process was that the sulfuric acid in some cases tended to be too strong so as to cleave some of the substituent groups on the silicon atoms and also the final product contained sulfuric acid which had to be neutralized before the diorganopolysiloxane product could be purified by stripping.

Another difficulty with the liquid acid catalyst was that it tended to equilibrate into the final product any water that was in the feed mixture as well as any silanol-stopped diorganopolysiloxane that was in the feed mixture to yield various by-products other than the desired triorganosiloxy end-stopped linear diorganopolysiloxane oil, thus, reducing the yields of the desired end product. The above procedure made it difficult to produce in any batch the desired triorgano end-stopped linear diorganopolysiloxane product of the desired viscosity.

In addition, with the use of such liquid acids as catalysts, it was very difficult if not impossible to utilize a continuous process.

Accordingly, the workers in the field developed in the use of such processes as catalysts various ion exchange resins as well as the use of acid treated solids such as, acid-treated carbon black and acid-treated clays.

Although, such catalysts performed well in the batch process they were very difficult to use in the continuous process for various reasons. In the case of the ion exchange resins, they were unduly expensive and thus had to be removed and regenerated periodically. They also could not withstand high temperatures, such as, above 150° C, and would tend to melt at such temperatures. The desirability for having high temperatures in the process was that the equilibration reaction was carried out at a much faster rate at higher temperatures and this was necessary in the continuous process, otherwise, there would be a long residence time of the polysiloxane fluid in the catalyst kettle resulting in the process being more batch rather than continuous.

In addition, if lower temperatures were used with such ion exchange resins, the water that was present in the initial feed mixture to the catalysis column could not be removed unless special procedures were utilized and even then the final product would contain some water which would have to be eliminated in a separate step before the low boilers could be separated from the desired polysiloxane product.

In the case of acid-activated clays, most such clays that were tried in this process by the workers in the field either did not catalyze sufficiently such that a long residence time was needed in the catalysis vessel, or else they had catalyzed to the point where they cleave the substituent groups on the silicon atom.

In addition, it was found that such acid-treated clays that were tested by the prior workers in the field were very difficult to utilize in a packed column since it is very difficult to force the polysiloxane feed mixture through the catalyst bed such that there resulted unduly long residence time in the catalysis column.

Accordingly, for the above reasons, workers in the field concluded ion exchange resins and acid-treated solids such as, acid-treated clays, were suitable in a batch process for making triorgano end-stopped linear diorganopolysiloxanes or else they were unsuited for use in a continuous process.

Acid treated carbon was also tried in such a process. However, most workers in the field found such acid-treated carbon to be ineffective in a continuous process for various reasons. One reason was that the fluid product coming from the acid-treated carbon bed would contain a high amount of acid in it which could be neutralized in a continuous manner only with some difficulty. For the use of acid-treated carbon black and more specifically a particular type of acid-treated carbon black in a continuous process which solves the problems experienced by prior art workers, reference is made to the copending application of George R. Siciliano, Ser. No. 433,095, filed on the same date as the present application.

Accordingly, it is one object of the present invention to provide a continuous process for the production of triorgano end-stopped diorganopolysiloxane oils of a viscosity of 3 to 50,000 centipoise at 25° C.

It is also another object of the present invention to provide a simple and economic process which is wholly continuous for the production of triorgano end-stopped linear diorganopolysiloxane polymers.

It is still another object of the present invention to provide a continuous process for the production of triorgano end-stopped linear diorganopolysiloxane oils utilizing a very inexpensive catalyst.

It is still another object of the present invention to provide a continuous process for producing a triorgano end-stopped linear diorganopolysiloxane oil wherein when such a polysiloxane oil continuously flows from the catalysis column it has in it 0 to 5 parts per million of acid and substantially no water.

These and other objects of the present invention are accomplished by means of the disclosure set forth herein below.

SUMMARY OF THE INVENTION

In accordance with the present invention, there is provided a continuous process for producing linear diorganopolysiloxane oils of a viscosity from 3 to 50,000 centipoise comprising continuously passing into the first column a feed mixture comprised of

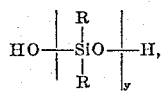

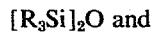

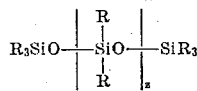

where R is selected from the class consisting of alkyl radicals, alkenyl radicals and cycloalkyl radicals of one to 15 carbon atoms, wherein the different R radicals may be the same or different, $x$ varies from 3 to 10, $y$ varies from 1 to 10 and $z$ varies from 1 to 10; continuously passing into said first column from 0 to 0.5 percent by weight of said feed mixture of an acid-activated hydroaluminum silicate and 25 to 50 percent by weight of said acid-activated hydroaluminum silicate of a diatomaceous earth; maintaining said first column at a temperature in the range of 150° to 200° C; continuously removing from said first column, water such that the product emanating from said first column has less than 1,000 parts per million of water; continuously removing a polysiloxane fluid mixture from said first column and passing it into a second column which is packed with an acid-activated hydroaluminum silicate which second column is maintained at 150° to 170° C and continuously transferring from the second column a product stream which has from 0 to 5 parts per million of acid in it and substantially no water which consists solely of the desired triorgano end-stopped linear diorganopolysiloxane product and low boilers such as, cyclicsiloxanes. This product stream may continuously be passed into a distillation columnn which has 5 to 30 millimeters of mercury vacuum in it and operates at a temperature of 250° to 300° C so as to strip all cyclicsiloxanes and low boilers from the product stream. There then emanates from the bottom of the distillation column, continuously, a product stream consisting entirely of the desired triorgano end-stopped linear diorganopolysiloxane oils having a viscosity of anywhere from 3 to 50,000 centipoise as is desired.

The catalyst both in the first column and in the second column is hydroaluminum silicate which is a particular type of clay. To operate in the present process, the catalyst, that is, the acid-activated hydroaluminum silicate, must be activated with either sulfuric or hydrochloric acid, must have an acid equivalent of 5 to 35 milligrams of KOH per gram of a solid, must have a mesh size of generally 10 microns to 200 microns and more preferably 100 microns to 140 microns.

Acid-activated clays other than hydroaluminum silicate and even hydroaluminum silicate that does not have the above specifications will not function in an efficient manner in the continuous process of the present invention.

DESCRIPTION OF THE PREFERRED EMBODIMENT

There is fed into the first column a siloxane feed mixture comprised of some or all of the following materials having the following formulas,

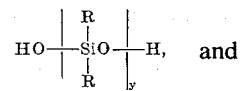

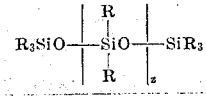

where R is selected from
the class consisting of alkyl radicals, alkenyl radicals and cycloalkyl radicals of one to 15 carbon atoms wherein the different R radicals may be the same or different, $x$ varies from 3 to 10, $y$ varies from 1 to 10 and $z$ varies from 1 to 10.

It is understood that in this feed mixture there may be cyclicsiloxanes and disiloxanes as chain stoppers or there may be cyclicsiloxanes combined with low molecular weight silanol-terminated diorganopolysiloxanes and/or triorganosiloxy end-stopped diorganopolysiloxanes of low molecular weight which also function as chain stoppers. Such low molecular weight triorganosiloxy end-stopped diorganopolysiloxanes may be in addition to the disiloxanes or in place of the disiloxanes. It is only necessary that in the feed mixture there be some low molecular weight linear diorganopolysiloxanes and preferably tetracyclicsiloxanes and some siloxanes containing triorganosiloxy units which function as chain stoppers for the final triorganosiloxy end-stopped linear diorganopolysiloxane polymer oil that is formed by the present process. However, any of the above low molecular weight silanol-terminated diorganopolysiloxanes, disiloxanes and low molecular weight triorganosiloxy chain-stopped diorganopolysiloxanes may be present in the feed mixture since these are common ingredients in the hydrolyzate that is produced by hydrolyzing a mixture of diorganodihalogensilanes and triorganohalogensilanes.

In the above formulas as is stated, the different cyclicsiloxanes as well as low molecular weight silanol-terminated diorganodisiloxanes, and low molecular weight triorganosiloxy end-stopped diorganopolysiloxanes, the R radical in these various compounds may be the same or different and may be selected from alkyl radicals, alkenyl radicals and cycloalkyl radicals. Most preferably, the R radical is selected from the lower alkyl radicals of one to eight carbon atoms and vinyl.

The feed mixture in the first column of the present process may be produced by hydrolyzing diorganosilanes of the formula $R_2SiX_2$, where X is halogen and preferably chlorine and R has the same definition as defined previously. Along with this diorganosilane there is preferably hydrolyzed together with it or separately the desired quantity of a silane of the formula $R_3SiX$, where X is again halogen and preferably chlorine and R has the same definition as defined previously. The amount and quantities of the diorganosilane versus the triorganosilane will depend on the amount of disiloxanes as well as low molecular weight triorganosiloxy end-stopped diorganopolysiloxanes it is desired to form in the hydrolyzate which materials will function as chain stoppers in the present process. Preferably, the triorganosilane and the diorganosilane are utilized at a high purity and more specifically at a 99 percent by weight or higher purity. The other constituents being comprised of other silanes which do not form the desired products. Although in the most preferred embodiment it is preferred that the triorganosilane and the diorganosilane be 100 percent pure, nevertheless, 1 percent by weight of other silanes can be tolerated in the present process.

To form the hydrolyzate, the diorganosilane and the triorganosilane are simply added slowly to water with agitation at room temperature, and preferably there is present an amount of water that is 10 to 200 percent in excess of the stoichiometric amount necessary to completely hydrolyze all the halogen groups. It is preferred that the halogen silanes and preferably the chlorosilanes be added to the water rather than having the water added to the chlorosilanes since that maintains the temperature of the reaction below room temperature or as close to room temperature as possible, thus, preventing the low boiling chlorosilanes from being stripped off or necessitating the use of condensation equipment on the reaction kettle. The addition of the silanes to the water takes place in a time period of anywhere from 1 to 5 hours. At the end of that time, the hydrolyzate is heated to temperatures of 50° to 70° C to strip off hydrogen chloride or the halogen acid that is formed during the hydrolysis and a base is added to neutralize any remaining acid that might be left in the hydrolyzate, preferably, a weak base such as, sodium bicarbonate. After the neutralization of the hydrolyzate, the water that is present is decanted off and separated so as to leave behind a mixture of polysiloxanes of the formulas given above, that is, of the formulas

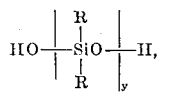 and

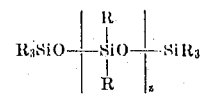

where R, x, y and z are as previously defined. It may be necessary to add to this hydrolyzate desired additional quantities of disiloxanes of the formula $(R_3SiO)_2$ and low molecular weight triorganosiloxy end-stopped diorganopolysiloxanes of the formula

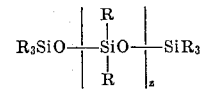

where R and z are as previously defined. These triorganosiloxy end-stopped siloxanes or additional siloxanes are added if it is necessary to add additional chain stoppers to obtain the desired molecular weight or viscosity range diorganopolysiloxane fluid polymer from the present process. If there is enough of these chain-stoppers in the hydrolysis mixture then it is not necessary to add additional amounts of them. As can be appreciated, the amount of the chain stoppers in the mixture, that is, of the disiloxanes and the low molecular weight triorganosiloxy end-stopped diorganopolysiloxane, will determine the average molecular weight and viscosity range of the final diorganopolysiloxane polymer or oil produced by the present process.

The above procedure illustrates the method for producing a feed mixture for the present process. However, it can be appreciated that other feed mixtures can be utilized, that is, feed mixtures only containing particular cyclicsiloxanes and triorganosiloxy end-stopped disiloxanes and mixtures containing cyclicsiloxanes of all types along with low molecular weight silanol-terminated diorganopolysiloxanes and triorgano end-stopped disiloxanes and/or low molecular weight triorganosiloxy end-stopped diorganopolysiloxanes. The feed mixture is immaterial. It is only necessary that there be present the desired siloxanes for forming the backbone of the final diorganopolysiloxane polymer and there will be present only the necessary and desired amounts of disiloxanes and low molecular weight triorganosiloxy end-stopped diorganopolysiloxanes to function as chain-stoppers so as to produce a final polymer product of the desired viscosity and desired molecular weight, that is, one having a viscosity of 3 to 50,000 centipoise at 25° C as desired.

The desired feed mixture is continuously passed into a first column which is maintained at a temperature of anywhere from 150° to 200° C, more preferably, 150° to 170° C. There is also continuously passed into this first column from 0 to 1 percent by weight of the feed mixture and more preferably 0 to 0.5 percent by weight of the feed mixture of the acid-activated hydroaluminum silicate catalyst of the present invention. This catalyst will more fully be defined further on so it will not be discussed in detail at this point.

The feed mixture contains low molecular weight silanol-terminated diorganopolysiloxanes and water, which constituents would be present in the most preferable feed mixture which was discussed above. The necessity for a small amount of catalyst at this point is to condense out the silanol groups in the low molecular weight silanol-terminated diorganopolysiloxane and also to polymerize the cyclictrisiloxane so that in effect there will be initial polymerization at this point. Otherwise, if these materials and more specifically the low molecular weight silanol-terminated diorganopolysiloxane is not condensed out in the first column and such low molecular weight silanol-terminated diorganopolysiloxane is present in the final catalysis, it will cause the formation of undesired by-products in the final step of the process, thus, lowering the yield of the desired polymer as well as cause the formation of water in the final catalysis bed which will lower the life of the acid-activated hydroaluminum silicate catalyst in the second column of the present process.

Accordingly, if such low molecular weight silanol-terminated diorganopolysiloxane polymer is present in the feed mixture in the first column which is fed continuously into the first column, then it is preferred to continuously add, as has been said, 0 to 1 percent by weight of the acid-activated hydroaluminum silicate into the first column.

It is also necessary to continuously add to the first column from 0.1 to 1 percent by weight percent of the feed mixture of a diatomaceous earth. The reason for the diatomaceous earth is that it expedites the flow rate of the siloxane mixture through the second column or through the final catalysis bed. In this first column there is also present an overhead condenser such that water is continually withdrawn from the feed mixture since, as has been stated previously, the presence of water above the desired amounts in the stream going to the final catalysis bed in the second column lowers the life of the catalysis bed.

Accordingly, one function of the continuously added acid-activated hydroaluminum silicate in the first column is to also polymerize any cyclictrisiloxane that is present in the feed mixture since such trisiloxane if unpolymerized in the first column will boil off and go to the overhead condenser, thus, pluging up or freezing up the condenser since it solidifies at the condensation temperature of water. The final product emanating from the first column contains generally less than 1,000 parts per million of water and more preferably less than 200 parts per million of water is maintained in the first column for anywhere from 0.5 to 5 hours during which course of time most of the water is removed from the siloxane mixture and the trisiloxanes are partially polymerized as well as the low molecular weight silanol-terminated diorganopolysiloxanes, such that the silanol groups are condensed out and the water thus formed is removed.

The acid-activated hydroaluminum silicate need not be added in the first column if no tricyclicsiloxanes or low molecular weight silanol-terminated diorganopolysiloxanes are present in the feed mixture.

Thus, a partially polymerized siloxane stream is continually passed from the first column which contains less than 1,000 ppm of water and substantially free of trisiloxanes and silanol-terminated diorganopolysiloxanes. This stream is then passed into a surge tank which is preferably jacketed so as to maintain the siloxane mixture therein at a temperature again of 150° to 200° C and more preferably 150° to 170° C. The siloxane mixture which is fed to the surge tank has a residence time in the surge tank of anywhere from 0.5 to 3 hours is then continuously passed into a second column which is the final catalysis column.

This final catalysis column is packed with a bed of acid-activated hydroaluminum silicate which is the equilibration catalyst of the process of the prsent invention.

The acid that is used to activate the hydroaluminum silicate may be either sulfuric or hydrochloric acid. Either acid-activated hydroaluminum silicate is suitable in the present invention. Hydroaluminum silicates activated with other acids were not found to be suitable or have the proper catalytic activity in the process of the present invention.

It is necessary also that the acid-activated hydroaluminum silicate have the proper acidity. If it is too acidic it will be too active and cleave substituent groups from the silicone atoms. If it is too low in acidity, it will not have the proper catalytic activity and the desired polymer will be formed over a prolonged period of time, thus, requiring excess residence time of the siloxane fluid mixture in the second catalysis column. Also, if the hydroaluminum silicate does not have the proper catalytic activity, the desired viscosity polymers will not be formed and the yield of the desired polymer that is formed will be considerably below the optimum. Thus, generally, the hydroaluminum silicate has an acid equivalent of 5 to 35 milligrams of KOH per gram of hydroaluminum silicate and more preferably 15 to 25 milligrams of KOH per gram of the hydroaluminum silicate. In addition, it is necessary that the acid-activated hydroaluminum silicate have the proper surface area in order to get as small a residence time as possible of the siloxane mixture in the final catalysis bed or the second column. Thus, generally, the acid-activated hydroaluminum silicate should have a U.S. mesh size that varies from 10 microns to 200 microns and preferably varies from 100 microns to 140 microns. A preferred form of acid-activated hydroaluminum silicate is the montmorillonite class of clays and more specifically the Filtrol class of catalyst manufactured by Filtrol Corporation, Los Angeles, California.

In addition, in order to obtain the desired polymers with a minimal residence time of the siloxane mixture in the final catalysis column, it is necessary that the acid-activated hydroaluminum silicate be present at a concentration at any time of 10 to 200 percent by weight of the siloxane fluid mixture present in the final catalysis column and more preferably at a concentration of 70 to 200 percent by weight of the siloxane fluid mixture present at any time in the final catalysis column.

It must be mentioned that the specifications for the acid-activated hydroaluminum silicate given above are necessary to the process of the present invention. Without the use of such an acid-activated hydroaluminum silicate as that defined above in the final catalysis column, the process is not economic and is inefficient.

The siloxane fluid mixture that is fed to the second column will have a residence time of anywhere from 10 minutes to 2 hours. By the time it passes out of the column, an equilibration will have been reached in the siloxane fluid mixture in which 85 percent of the siloxane mixture that was fed to the final catalysis column has been converted to the desired triorgan siloxy endstopped diorganopolysiloxane polymers and the remaining 15 percent of the siloxane mixture is mostly in a cyclicsiloxane form.

It must be appreciated that in a most efficient process, 85 percent of the siloxane fluid mixture fed to the final catalysis column should have been converted to the desired triorgano end-stopped linear diorganopolysiloxane polymers in the periods of time specified above, otherwise, the column is not operating efficiently. This final catalysis column in order to carry out the equilibration reaction as fast as possible is maintained at a temperature of 150° to 200° C and more preferably at a temperature to 160° to 180° C. In addition, to force the siloxane fluid mixture through the column as quickly as possible, it is preferred that the fluid siloxane mixture that is fed in this final catalysis column or bed be fed in at a pressure of anywhere from 15 to 100 pounds per square inch gauge and the desired product stream that continuously emanates from the column should be at substantially atmospheric pressure.

It can be appreciated that after a while the catalyst of the present invention, that is, the acid-activated hydroaluminum silicate, will be deactivated. Accordingly, to keep the process truly continuous, there can be present two such columns such that when the catalyst is deactivated at one column, the continuous stream of siloxane fluid mixture to the final catalysis column can be switched from the spent column to the new column and while the new column is operating the spent catalyst can be replaced. In this way, the process of the present invention can be truly continuous at all times.

The product polysiloxane fluid stream from the final catalysis column or second column is continually transferred from that column, as had been stated, which basically contains 85 percent of the triorganosiloxy end-stopped diorganopolysiloxane product that is desired and about 15 percent of low boilers such as, cyclicsiloxanes. Accordingly, this stream can be continuously fed into a distillation column which is operated anywhere from 200° to 300° C and more preferably from 250° to 300° C and under vacuum such as, 5 to 90 millimeters of vacuum and the low boilers stripped off so as to leave a final product that emanates from the bottom of the distillation column of the desired triorganosiloxy end-stopped linear diorganopolysiloxane product having the desired viscosity, that is, a viscosity of anywhere from 3 to 50,000 centipoise at 25° C. The low boilers which are stripped off in the distillation column cann then be recycled into the feed mixture going into the first column, as needed.

It should also be noted that when the product stream emanates from the second column or bed it will contain from 0 to 5 parts per million of acid which is acceptable, thus, it does not have to be neutralized or treated in any manner and said product stream will contain substantially no water so there is no decantation of water that is necessary from the product stream of the final catalysis column in the process of the present invention.

Utilizing the foregoing process of the present invention, there is provided a truly continuous process for the production of triorgano end-stopped linear diorganopolysiloxane polymers or oils having a viscosity of anywhere from 3 to 50,000 centipoise at 25° C and more preferably 3 to 5,000 centipoise at 25° C. The oils or polymers produced by the process of the present invention have many uses, as has been stated previously, as hydraulic fluids, as components of greases, antifoam agents, lubricants, automobile brake fluids and also components of silicone paper release compositions and many other uses.

The following examples are given for the purpose of illustrating the present invention and are not intended to limit or define the scope of the present invention as defined in the present specification and claims. All parts in the examples are by weight.

EXAMPLE 1

There is continuously fed into a first column a siloxane feed mixture at a rate of 1750 pounds per hour composed of 4.5 weight percent $[(CH_3)_3Si]_2O$ and 95.5 percent by weight of a mixture of

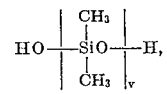

where $v$ varies from 10 to 20 ml $[(CH_3)_2SiO]_w$ where $w$ varies from 3 to 8. The first column is maintained at a temperature of 150° to 160° C and this is continuously removed by an overhead condenser reactor. Also, the overhead condenser returns the low boiling cyclicsiloxanes back to the prior siloxane fluid body. The residence time in the first column is hours. There is also continuously fed into the first column 1.7 pounds per hour of Filtrol 20, manufactured by the Filtrol Corporation of Los Angeles, California, which is a sulfuric acid terminated hydroaluminum silicate. Further, to facilitate purge of the siloxane fluid mixture through the first catalysis column there is fed into the first column 0.85 pounds per hour of Celite 545, a diatomaceous earth maufactured by Johns-Manville. The partially polymerized siloxane mixture from the first column is passed into a surge tank at the rate of 1,750 pounds per hour, which is maintained at 150° C. From the surge tank the siloxane fluid mixture is transferred into the first catalysis column containing 200 pounds of Filtrol 20 and 100 pounds of Celite 545. The first catalysis column is maintained at 160° C, the input pressure of the siloxane fluid stream to the final catalysis column is 25 psig, while the outflow pressure is at atmospheric pressure. The residence time of the siloxane fluid mixture in the first catalysis column is 1 hour. From the first catalysis column there continuously flows a siloxane product stream at 1,750 pounds per hour which has a viscosity of 83 centistokes at 20° C, less than 3 ppm of acid and substantially free of water. The product stream is fed into a continuous stripping column maintained at 300° C and 5 mm of Hg pressure where all the low boilers are removed. From the stripping column there is obtained a final product which is a trimethylsiloxy end-stopped dimethylpolysiloxane of 130 centistokes viscosity at 25° C.

EXAMPLE 2

There is continuously fed into a first column a siloxane feed mixture at a rate of 1,750 pounds per hour composed of 10.0 weight percent $[(CH_3CH_2)_3Si]_2O$ and 90.0 percent by weight of a mixture of

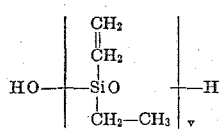

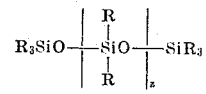

where $v$ varies from 10 to 20 ml [CH$_3$CH$_2$(CH$_2$=CH)SiO]$_w$ where $w$ varies from 3 to 8. The first column is maintained at a temperature of 150° to 160° C and this is continuously removed by an overhead condenser reactor. Also, the overhead condenser returns the low boiling cyclicsiloxanes back to the prior siloxane fluid body. The residence time in the first column is hours. There is also continuously fed into the first column 1.7 pounds per hour of Filtrol 20, manufactured by the Filtrol Corporation of Los Angeles, California, which is a sulfuric acid terminated hydroaluminum silicate. Further, to facilitate purge of the siloxane fluid mixture through the first catalysis column there is fed into the first column 0.85 pounds per hour of Celite 545, a diatomaceous earth manufactured by Johns-Manville. The partially polymerized siloxane mixture from the first column is passed into a surge tank at the rate of 1,750 pounds per hour, which is maintained at 150° C. From the surge tank the siloxane fluid mixture is transferred into the first catalysis column containing 100 pounds of Filtrol 20 and 50 pounds of Celite 545. The first catalysis column is maintained at 160° C, the input pressure of the siloxane fluid stream to the final catalysis column is 35 psig while the outflow pressure is at atmospheric pressure. The resilience time of the siloxane fluid mixture in the first catalysis column is 1 hour. From the first catalysis column there continuously flows a siloxane product stream at 1,750 pounds per hour which has a viscosity of 200 centistokes at 20° C, less than 3 ppm of acid and substantially free of water. The product stream is fed into a continuous stripping column maintained at 300° C and 5 mm of Hg pressure where all the low boilers are removed. From the stripping column there is obtained a final product which is a triethylsiloxy end-stopped diethylvinylpolysiloxane of 350 centistokes viscosity at 25° C.

We claim:

1. A continuous process for producing linear diorganopolysiloxane oils of a viscosity from 3 to 50,000 centipoise at 25° C comprising (a) continuously passing into a first column a feed mixture composed of compounds selected from the class consisting of

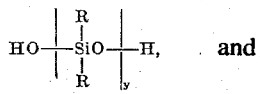

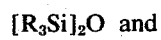

and mixtures thereof, where R is selected from the class consisting of alkyl radicals, alkenyl radicals and cycloalkyl radicals of one to 15 carbon atoms, $x$ varies from 3 to 10, $y$ varies from 1 to 10 and $z$ varies from 1 to 10; (b) continuously passing into said first column from 0 to 1.0 percent by weight of said feed mixture of an acid-activated hydroaluminum silicate and 0.1 to 1 percent by weight of said feed mixture of a diatomaceous earth; (c) maintaining said first column at a temperature in the range of 150° – 200° C; (d) continuously removing from column first columnn a fluid siloxane mixture such that the fluid siloxane mixture emanating from said first column has less than 1,000 parts per million of water; (e) transferring the fluid siloxane mixture from said first column into a second column which is packed with an acid-activated hydroaluminum silicate which second column is maintained at 150°–200° C; and (f) continuously transferring the desired product stream out of the second column.

2. The process of claim 1, wherein in step (e) after the fluid siloxane mixture is removed from said first column further comprising continuously transporting said fluid siloxane mixture into a surge tank and then passing it from said surge tank into said second column.

3. The process of claim 2 wherein the fluid siloxane mixture pressure of the inlet side of said second column varies from 75 to 100 psi gauge and the pressure of the desired product stream at the outlet side of said second column is atmospheric.

4. The process of claim 3 further comprising transporting said desired product stream from said second column to a distillation column maintained at 250°–300° C and 5 to 90 mm of Hg pressure so as to strip out all low boiling siloxanes and removing from the distillation column the desired product polysiloxane polymer in high purity.

5. The process of claim 1 wherein the product stream from said second column has an acidity of 0 to 5 parts per million.

6. The process of claim 1 wherein the residence time of the fluid siloxane mixture in said first column is 0.5 to 5 hours and wherein the fluid siloxane mixture in said second column is from 10 minutes to 2 hours.

7. The process of claim 1 wherein the acid-activated hydroaluminum silicate is activated with H$_2$SO$_4$.

8. The process of claim 7 wherein the hydroaluminum silicate is activated with HCl.

9. The process of claim 8 wherein the acid-activated hydroaluminum silicate has an acid equivalent of 5 to 35 mg of KOH per gram.

10. The process of claim 1 wherein R is selected from the class consisting of methyl, ethyl and vinyl.

11. The process of claim 9 wherein the hydroaluminum silicate has a U.S. mesh size that varies from 10 microns to 800 microns.

12. The process of claim 1 wherein in said second column the acid-activated hydroaluminum silicate is present at a concentration of 10 to 200 percent by weight of the fluid siloxane mixture.

* * * * *